United States Patent
Huang et al.

(10) Patent No.: US 11,265,593 B2
(45) Date of Patent: Mar. 1, 2022

(54) DISPLAY DEVICE, HARDWARE DONGLE CAPABLE OF COUPLING TO THE DISPLAY DEVICE, AND METHOD FOR CONTROLLING THE DISPLAY DEVICE

(71) Applicants: BenQ Intelligent Technology (Shanghai) Co., Ltd, Shanghai (CN); BENQ CORPORATION, Taipei (TW)

(72) Inventors: Chen-Cheng Huang, Taipei (TW); Chang-Sheng Lee, Taipei (TW)

(73) Assignees: BenQ Intelligent Technology (Shanghai) Co., Ltd; BENQ CORPORATION, Taipei (TW)

( * ) Notice: Subject to any disclaimer, the term of this patent is extended or adjusted under 35 U.S.C. 154(b) by 35 days.

(21) Appl. No.: 15/930,464

(22) Filed: May 13, 2020

(65) Prior Publication Data

US 2020/0366864 A1 Nov. 19, 2020

(30) Foreign Application Priority Data

May 16, 2019 (CN) .......................... 201910406970.4

(51) Int. Cl.
*H04N 21/422* (2011.01)
*G08C 17/02* (2006.01)

(52) U.S. Cl.
CPC ....... *H04N 21/42204* (2013.01); *G08C 17/02* (2013.01); *H04N 21/42206* (2013.01); *H04N 21/42208* (2013.01)

(58) Field of Classification Search
CPC ....... H04N 21/42204; H04N 21/42206; H04N 21/42208; G08C 17/02; G11B 19/027; H04L 63/0853; H04L 63/0876
See application file for complete search history.

(56) References Cited

U.S. PATENT DOCUMENTS

| 10,091,456 | B2 | 10/2018 | Dickens | |
|---|---|---|---|---|
| 2011/0157015 | A1* | 6/2011 | Ye | G06F 3/017 345/158 |
| 2011/0219159 | A1* | 9/2011 | Park | G06F 13/00 710/300 |
| 2013/0109371 | A1* | 5/2013 | Brogan | G06F 1/1684 455/420 |

FOREIGN PATENT DOCUMENTS

| CN | 103096004 A | 5/2013 |
|---|---|---|
| CN | 109429097 A | 3/2019 |
| TW | I473495 B | 2/2015 |
| TW | M576682 U | 4/2019 |

* cited by examiner

*Primary Examiner* — Vernal U Brown
(74) *Attorney, Agent, or Firm* — Winston Hsu (57) ABSTRACT

A method for controlling a display device includes establishing a data link between the display device and a hardware dongle, generating a second interface by the display device through the hardware dongle after the data link is established, generating a control signal by the display device through the second interface, and executing at least one function according to the control signal. A first interface is stored in the display device. The first interface and the second interface are different. At least one first function is supported by the display device. At least one second function is supported by the hardware dongle. The at least one first function and the at least one second function are integrated for generating the second interface by the display device after the data link is established.

18 Claims, 4 Drawing Sheets

DISPLAY DEVICE, HARDWARE DONGLE CAPABLE OF COUPLING TO THE DISPLAY DEVICE, AND METHOD FOR CONTROLLING THE DISPLAY DEVICE

BACKGROUND OF THE INVENTION

1. Field of the Invention

The present invention illustrates a display device, a hardware dongle capable of coupling to the display device, and a method for controlling the display device, and more particularly, a display device providing a user-defined interface or a specific operating system based interface, a hardware dongle capable of coupling to the display device for providing various functions, and a method for controlling the display device to execute designated functions through the user-defined interface or the specific operating system based interface.

2. Description of the Prior Art

With the developments of technologies, various display systems are widely used in our daily life. For example, a projector can be connected to a computer for projecting an image of the computer to a screen. A liquid crystal display (LCD) device can be connected to a video signal source (i.e., such as a DVD player) for providing various multimedia functions for a user. Currently, a display system can provide various adjustable image parameters for the user to optimize displayed images. For example, the LCD device can perform an On-Screen Display (OSD) function by using a built-in processor (i.e., such as a Scaler) for providing a graphical user interface (GUI).

In an advanced display system, the display system can support additional functions provided by a hardware plug-in device (i.e., a hardware dongle). For example, after the hardware dongle is connected (or linked) to the LCD device, the user can perform additional functions of the hardware dongle, such as performing at least one function of a specific application program (app) installed in the hardware dongle. However, for the user, even if the hardware dongle is connected to the LCD device, the LCD device can only display its built-in GUI. The built-in GUI can be regarded as a basic interface for providing some basic function options. Further, when the user uses the hardware dongle for executing some advanced application programs, the hardware dongle only provides the image data of these advanced application programs currently executed. In other words, although some advanced functions of the LCD device can be expanded by using the hardware dongle, the built-in GUI of the LCD device is not updated. Therefore, the built-in GUI displayed on the LCD device and some advanced functions provided by the hardware dongle are inconsistent. Therefore, since the built-in GUI displayed on the LCD device is not updated, when the hardware dongle is connected to the LCD device, a part of function options corresponding to the hardware dongle cannot be intuitively selected by the user, resulting in inconvenience of operation.

SUMMARY OF THE INVENTION

In an embodiment of the present invention, a method for controlling a display device is disclosed. The method comprises establishing a data link between the display device and a hardware dongle, generating a second interface by the display device through the hardware dongle after the data link is established, generating a control signal by the display device through the second interface, and executing at least one function according to the control signal. A first interface is stored in the display device. The first interface and the second interface are different. At least one first function is supported by the display device. At least one second function is supported by the hardware dongle. The at least one first function and the at least one second function are integrated for generating the second interface by the display device after the data link is established.

In another embodiment of the present invention, a display device capable of coupling to a hardware dongle is disclosed. The display device comprises a first processor, a first memory coupled to the first processor, and a transmission port coupled to the first processor. The hardware dongle comprises a signal transceiver and a second processor. The second processor is coupled to the signal transceiver. The first processor establishes a data link to the signal transceiver through the transmission port. The second processor generates a second interface to the first processor after the data link is established. The first processor generates a control signal through the second interface for executing at least one function. A first interface is stored in the first memory. The first interface and the second interface are different. At least one first function is supported by the first processor. At least one second function is supported by the second processor. The at least one first function and the at least one second function are integrated for generating the second interface by the first processor after the data link is established.

In another embodiment of the present invention, a hardware dongle capable of coupling to a display device is disclosed. The hardware dongle comprises a signal transceiver and a second processor. The second processor is coupled to the signal transceiver. The display device comprises a first processor, a first memory, and a transmission port. The first memory is coupled to the first processor. The transmission port is coupled to the first processor. The signal transceiver establishes a data link to the first processor through the transmission port. The second processor generates a second interface to the first processor after the data link is established. The first processor generates a control signal through the second interface for executing at least one function. The first interface and the second interface are different. At least one first function is supported by the first processor. At least one second function is supported by the second processor. The at least one first function and the at least one second function are integrated for generating the second interface by the first processor after the data link is established.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
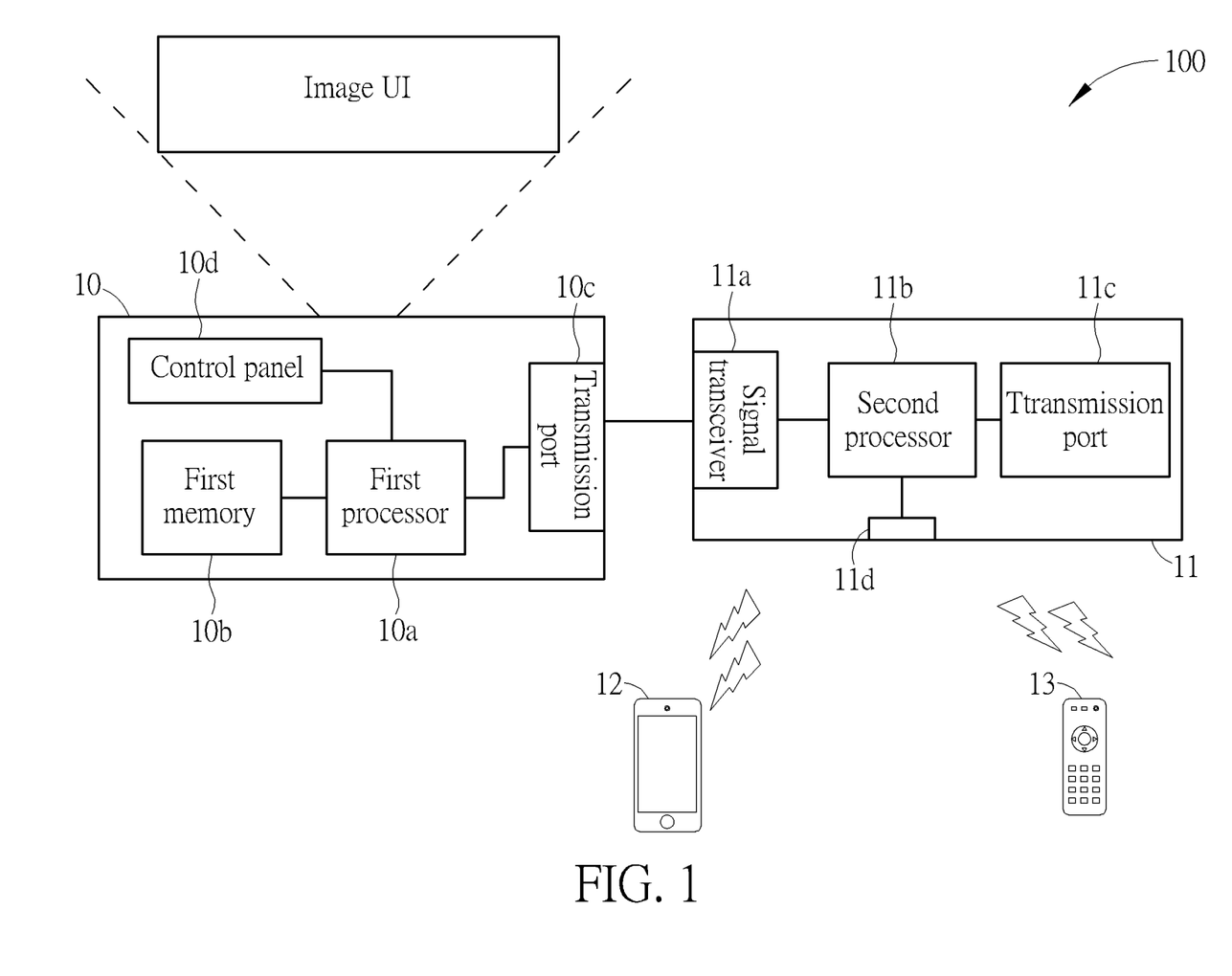
FIG. 1 is a block diagram of a display system according to an embodiment of the invention.

FIG. 1 is a block diagram of a display system 100 according to an embodiment of the invention. The display system 100 includes a display device 10 and a hardware dongle 11. The display system 100 can be applied to any device capable of displaying images. For example, the display device 10 of the display system 100 can be a projector for projecting an image UI to a plane. The display device 10 of the display system 100 can be a liquid crystal display (LCD) device, a tablet, a notebook, or any display screen. The hardware dongle 11 can be a portable hardware device, such as a universal serial bus (USB) based hardware device or a high-definition multimedia interface (HDMI) based hardware device. The display device 10 includes a first processor 10a, a first memory 10b, and a transmission port 10c. The first processor 10a can be any processing device, such as a scaler. The first memory 10b is coupled to the first processor 10a. The first memory 10b can be used for saving a first interface. The first interface can be a built-in interface for adjusting various operating parameters of the display device 10. The transmission port 10c is coupled to the first processor 10a. The transmission port 10c can be any wired or wireless transmission port, such as an USB port, an HDMI port, an infrared port, a Bluetooth port, or a Wi-Fi port. For a single display device 10 (i.e., the hardware dongle 11 is not connected to the display device 10), the first processor 10a can control the display device 10 for displaying the first interface. The first interface can list at least one first operating option, such as a boot up option, a shutdown option, a color tone adjustment option, or a brightness adjustment option. A user can use at least one first operating option through the first interface for controlling the first processor 10a to execute at least one first function. For example, the user can use the shutdown option through the first interface for controlling the first processor 10a to turn off the display device 10.

However, as previously mentioned, the first interface is the built-in interface for providing some basic function options. Therefore, the hardware dongle 11 can be introduced to the display system 100 for generating a second interface having advanced and optimized function options, as illustrated below. The hardware dongle 11 includes a signal transceiver 11a and a second processor 11b. The second processor 11b is coupled to the signal transceiver 11a. The second processor 11b can be any processing device, such as a microprocessor. The signal transceiver 11a can correspond to a communications standard of the transmission port 10c of the display device 10. For example, when the transmission port 10c is an HDMI port, the signal transceiver 11a can be a plug device corresponding to the HDMI port. The hardware dongle 11 can further include a second memory 11c. The second memory 11c is coupled to the second processor 11b. The second memory 11c can be used for saving data of the second interface and used for installing an operating system (OS) supported by the hardware dongle 11, such as an Android operating system capable of providing an Android interface. The second memory 11c can be used for saving various application programs operated under the operating system, such as an application program of YouTube. In the display system 100, the first processor 10a can establish a data link to the signal transceiver 11a through the transmission port 10c. The second processor 11b can generate a second interface to the first processor 10a after the data link is established. The first processor 10a can generate a control signal through the second interface for executing at least one function. Further, the first interface (i.e., the built-in interface) stored in the first memory 10b of the display device 10 and the second interface (i.e., the Android interface) of the hardware dongle 11 can be different. At least one first function is supported by the first processor 10a, such as a boot up function, a shutdown function, a color tone adjustment function, or a brightness adjustment function. At least one second function is supported by the second processor 11b, such as a YouTube function, or a Netflix function. The at least one first function and the at least one second function are integrated for generating the second interface by the first processor 10a after the data link is established. In other words, the at least one first function can be regarded as at least one built-in function of the display device 10. The at least one second function can be regarded as at least one expandable application program function operated under the operating system installed in the hardware dongle 11. When the display device 10 displays the second interface, the user can arbitrarily control the built-in functions of the display device 10 and the expandable application program functions of the hardware dongle 11. In other words, the second interface can be regarded as a customized interface with high operational flexibility and high operational convenience.

In the display system 100, the display device 10 can further include a control panel 10d. The control panel 10d is coupled to the first processor 10a for inputting (or selecting) at least one second operating option to the second interface. The display system 100 can further include a smart phone 12 or a remote controller 13. After the transmission port 10c is coupled to the signal transceiver 11a of the hardware dongle 11, the signal transceiver 11a can link to the smart phone 12 or the remote controller 13 through a wireless communications device 11d for receiving control data. The smart phone 12 or the remote controller 13 can be used for inputting (or selecting) the at least one second operating option to the second interface. For example, when the wireless communications device 11d supports Bluetooth communications, the wireless communications device 11d can establish a data link to the smart phone 12. Then, the control data of the smart phone 12 can be transmitted to the signal transceiver 11a of the HDMI standard through the wireless communications device 11d. The wireless communications device 11d can be regarded as a relay node. The signal transceiver 11a can transmit the control data to the first processor 10a through the transmission port 10c for controlling the display device 10. However, the display 100 is not limited by aforementioned communications mode. For example, an application program can be installed in the smart phone 12 for optimizing operational efficiency. The smart phone 12 or the remote controller 13 can also be directly linked to the display device 10 for directly controlling the first processor 10a of the display device 10. Any reasonable hardware modification or technology modification falls into the scope of the present invention.

Figure 2:
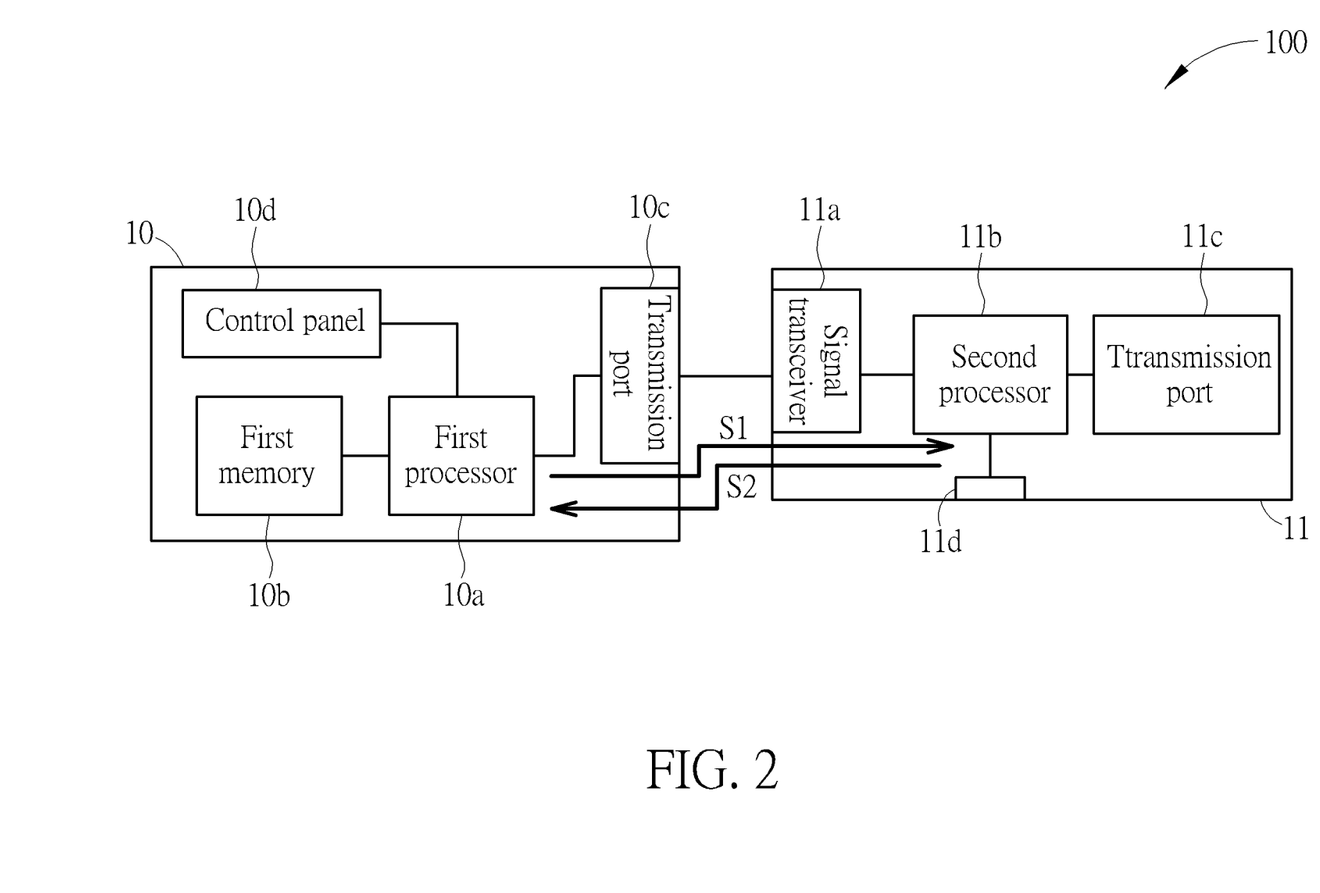
FIG. 2 is an illustration of a first bidirectional communications between a display device and a hardware dongle of the display system in FIG. 1.

FIG. 2 is an illustration of a first bidirectional communications between the display device 10 and the hardware dongle 11 of the display system 100. Here, data transmission by using bidirectional communications between the display device 10 and the hardware dongle 11 is available in the display system 100. In other words, the data link between the display device 10 and the hardware dongle 11 can be used for transmitting a video signal and a control signal of the second interface. The control signal carries the control data. Details are illustrated below. After the data link between the display device 10 and the hardware dongle 11 is established, the display device 10 can display the second interface (i.e., for example, the control interface operated under the Android OS). The second interface includes a plurality of second operating options. The user can use the control panel 10d, the smart phone 12, or the remote controller 13 for selecting or inputting at least one second operating option to the second interface. Then, the first processor 10a can transmit the control signal S1 to the second processor 11b. When the control signal S1 corresponds to the at least one second operating option, the second processor 11b can execute the at least one second function according to the control signal S1. For example, the user selects a video play function of the YouTube application program by using the second interface of display device 10. Then, the first processor 10a can generate the control signal S1 for requesting the second processor 11b to execute at least one application program (i.e., the YouTube application program) operated under the operating system (i.e., the Android OS). Then, the second processor 11b can transmit image data S2 of the at least one application program (i.e., the YouTube application program) to the first processor 10a after the at least one application program is executed. Therefore, the display 10 can display videos of the YouTube application program. In other words, in FIG. 2, the hardware dongle 11 can be regarded as a portable hardware capable of providing expandable application programs and providing an advanced second interface. The second interface can be displayed under the operating system. The second processor 11b can perform the at least one second function by executing the at least one application program. By doing so, since video functions of the display device 10 can be expanded (i.e., such as video functions of the YouTube application program) by using the hardware dongle 11 through the second interface, the display system 100 can provide satisfactory visual experience and advanced functions of the expandable application programs.

Figure 3:
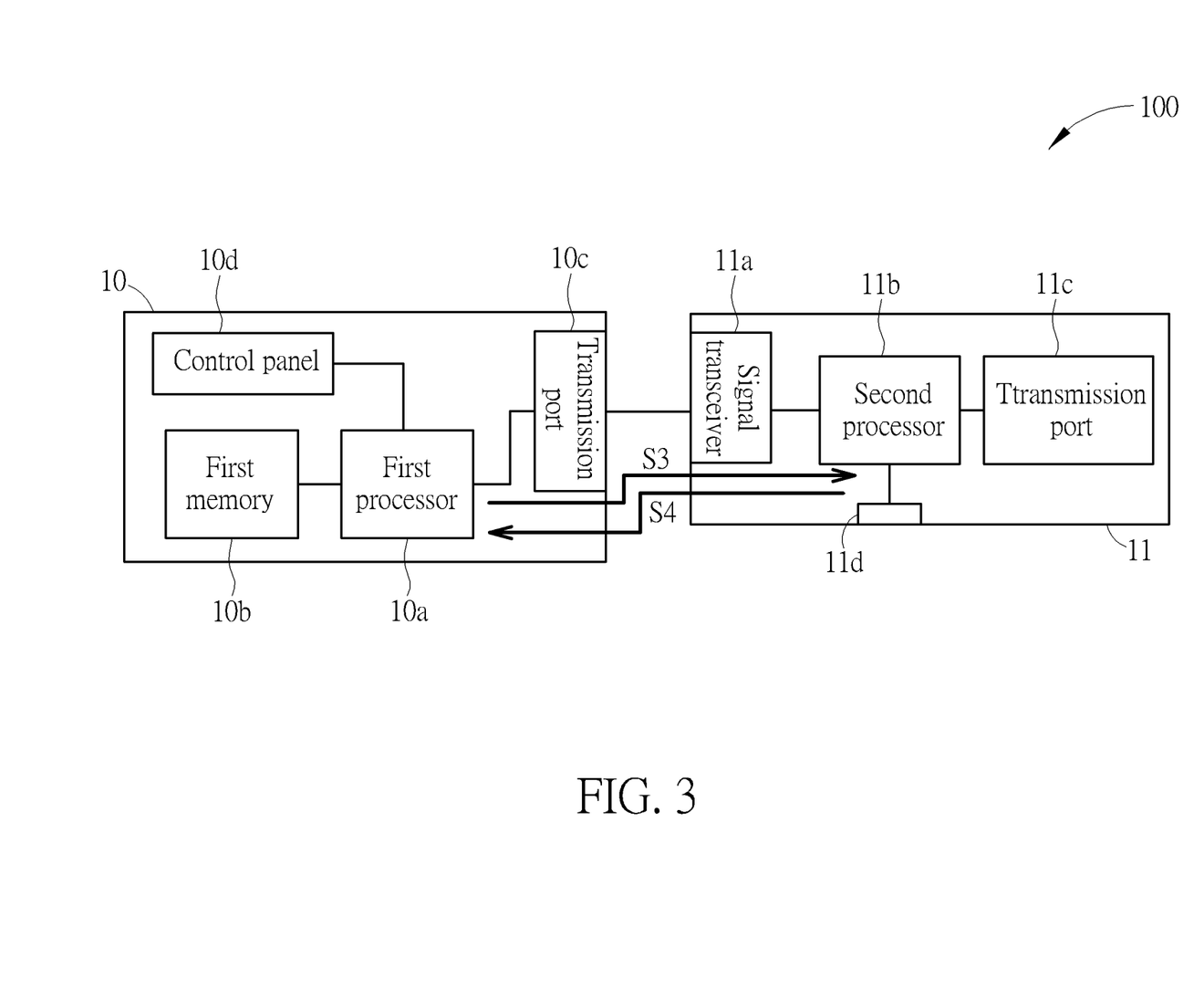
FIG. 3 is an illustration of a second bidirectional communications between the display device and the hardware dongle of the display system in FIG. 1.

FIG. 3 is an illustration of a second bidirectional communications between the display device 10 and the hardware dongle 11 of the display system 100. In FIG. 3, after the data link between the display device 10 and the hardware dongle 11 is established, the display device 10 can display the second interface (i.e., for example, the control interface operated under the Android OS). The second interface includes the plurality of second operating options. The user can use the control panel 10d, the smart phone 12, or the remote controller 13 for selecting or inputting at least one second operating option to the second interface. Then, the first processor 10a can transmit the control signal S3 to the second processor 11b. As previously mentioned, the first interface can list the at least one first operating option (i.e., built-in function), such as the boot up option, the shutdown option, the color tone adjustment option, or the brightness adjustment option. The second interface (i.e., the control interface operated under the Android OS) can list the at least one second operating option. However, positions, design patterns, operation methods, and data paths of the at least one first operating option of the first interface and at least one second operating option of the second interface can be different. Therefore, the first processor 10a can map the at least one first operating option of the first interface to the at least one second operating option of the second interface. For example, the shutdown option of the first interface can be mapped to a shutdown option of the second interface operated by the Android OS. In FIG. 3, when the control signal S3 corresponds to the at least one first operating option, the second processor 11b can map the control signal S3 to a control code through the second interface and can transmit a command signal S4 to the first processor 10a for executing the at least one first function according to the control code. For example, the user selects a first operating option from the second interface for adjusting image color tones. Since a function of adjusting the image color tones is a built-in function of the display device 10, a control code corresponding to the function of adjusting the image color tones is present. Thus, the second processor 11b can transmit the command signal S4 to the first processor 10a for executing the function of adjusting the image color tones selected from the second interface according to the control code. Then, the image color tones can be adjusted by the first processor 10a. In other words, the user can select a built-in function (the first function) of the display device 10 through the advanced second interface provided by the hardware dongle. Therefore, the display system 100 can provide satisfactory visual experience and the advanced operation interface for executing basic functions.

Further, the display system 100 can use an automatic method for optimizing content data of the built-in interface. For example, after the hardware dongle 11 is linked to the transmission port 10c, the first processor 10a of the display device 10 can detect the communicating stability of the hardware dongle 11 connected to the display device 10 through the transmission port 10c. When the hardware dongle 11 is stably connected to the transmission port 10c, the first processor 10a can automatically optimize or adjust content data or a format of the first interface by mapping at least one first operating option of the first interface to at least one second operating option of the second interface. In other words, after the content data or the format of the first interface is adjusted, the first processor 10a can communicate with the second processor 11b for converting the first interface to the second interface. Finally, the display device 10 can automatically display the second interface. For example, information of the second interface can be displayed in form of pop-up messages. Therefore, the user can use the advanced control interface for executing some functions. Further, the hardware dongle 11 can be driven without any external AC grid or DC grid. In other words, after the hardware dongle 11 is connected to the transmission port 10c, the hardware dongle 11 can be directly driven by a current supplied from the transmission port 10c. Therefore, the operational convenience can be increased.

Figure 4:
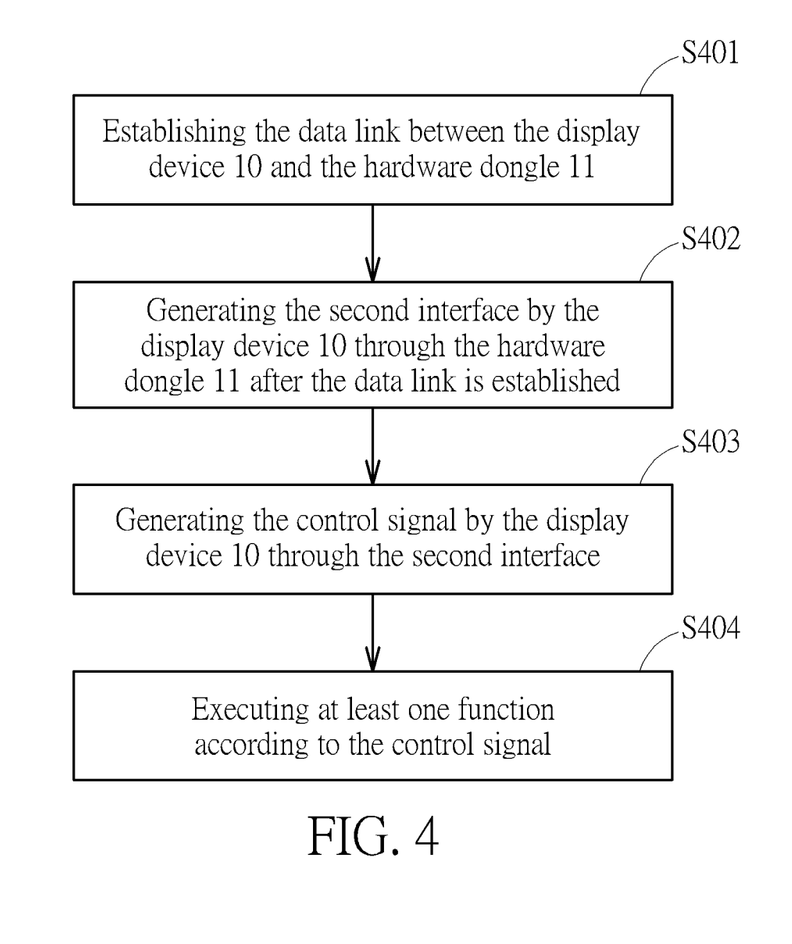
FIG. 4 is a flow chart of a method for controlling the display device performed by the display system in FIG. 1.

FIG. 4 is a flow chart of a method for controlling the display device 10 performed by the display system 100. The method for controlling the display device 10 can include step S401 to step S404. Any reasonable technology modification falls into the scope of the present invention. Step S401 to step S404 are illustrated below.

step S401: establishing the data link between the display device 10 and the hardware dongle 11;

step S402: generating the second interface by the display device 10 through the hardware dongle 11 after the data link is established;

step S403: generating the control signal by the display device 10 through the second interface;

step S404: executing at least one function according to the control signal.

Details of the step S401 to step S404 are previously mentioned. Thus, they are omitted here. In the display system 100, the display device 10 has the built-in interface (i.e., the first interface) for providing basic functions. However, after the data link between the display device 10 and the hardware dongle 11 are established through the transmission port 11c, the display device 10 can automatically convert the first interface to the second interface. Then, the display device 10 can display the second interface. Since the second interface can be regarded as the advanced interface, the operational convenience of controlling the interface can be increased for the user.

To sum up, the present invention discloses a display system. A display device of the display system has a built-in interface. The display device can automatically display an advanced interface by using the hardware dongle connected to the display device. Further, the user can switch the advanced interface to the built-in interface at any time. Therefore, the display system can provide satisfactory visual experience in conjunction with high operational convenience for controlling various basic or advanced functions for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a display device comprising:
    establishing a data link between the display device and a hardware dongle;
    generating a second interface by the display device through the hardware dongle after the data link is established;
    generating a control signal by the display device through the second interface;
    inputting at least one second operating option to the second interface by using a control panel disposed on the display device;
    transmitting the control signal from the display device to the hardware dongle after the at least one second operating option is inputted;
    executing the at least one second function by the hardware dongle according to the control signal and transmitting image data of the at least one second function from the hardware dongle to the display device when the control signal corresponds to the at least one second function; and
    mapping the control signal to a control code by the hardware dongle through the second interface and transmitting a command signal to the display device for executing at least one first function according to the control code when the control signal corresponds to the at least one first function;
    wherein a first interface is stored in the display device, the first interface and the second interface are different, the at least one first function is supported by the display device, at least one second function is supported by the hardware dongle, and the at least one first function and the at least one second function are integrated for generating the second interface by the display device after the data link is established.

2. The method of claim 1, wherein an operating system (OS) is supported by the hardware dongle, and the method further comprises:
    the display device requesting the hardware dongle for executing at least one application program operated under the operating system by using the control signal; and
    transmitting image data of the at least one application program from the hardware dongle to the display device after the at least one application program is executed;
    wherein the second interface is displayed under the operating system, and the at least one application program of the hardware dongle is configured to execute the at least one second function.

3. The method of claim 1, further comprising:
    controlling the display device to execute the at least one first function.

4. The method of claim 1, further comprising:
    detecting communicating stability of the hardware dongle connected to the display device through a transmission port; and
    mapping at least one first operating option of the first interface to the at least one second operating option of the second interface when the hardware dongle is stably connected to the transmission port.

5. The method of claim 4, further comprising:
    adjusting content data or a format of the first interface when the hardware dongle is stably connected to the transmission port;
    converting the first interface to the second interface after the content data or the format of the first interface is adjusted; and
    displaying the second interface on the display device.

6. The method of claim 1, wherein the first interface is a built-in interface, the second interface in a user-defined interface, the at least one first function is at least one built-in function, and the at least one second function is at least one expandable application program function operated under an operating system (OS).

7. The method of claim 1, wherein the data link is configured to transmit a video signal and the control signal of the second interface between the display device and the hardware dongle.

8. A display device capable of coupling to a hardware dongle, the display device comprising:
    a first processor;
    a first memory coupled to the first processor;
    a transmission port coupled to the first processor; and
    a control panel coupled to the first processor and configured to input at least one second operating option to a second interface;
    wherein the hardware dongle comprises a signal transceiver and a second processor, the second processor is coupled to the signal transceiver, the first processor establishes a data link to the signal transceiver through the transmission port, the second processor generates the second interface to the first processor after the data link is established, the first processor generates a control signal through the second interface for executing at least one function, a first interface is stored in the first memory, the first interface and the second interface are different, at least one first function is supported by the first processor, at least one second function is supported by the second processor, and the at least one first function and the at least one second function are integrated for generating the second interface by the first processor after the data link is established; and
    wherein the first processor transmits the control signal to the second processor, when the control signal corresponds to the at least one second operating option, the second processor executes the at least one second function according to the control signal and transmits image data of the at least one second function to the first processor, and when the control signal corresponds to at least one first operating option, the second processor maps the control signal to a control code through the second interface and transmits a command signal to the first processor for executing the at least one first function according to the control code.

9. The display device of claim 8, wherein the transmission port is configure to link to the signal transceiver, the hardware dongle further comprises a second memory, the second memory is configured to install an operating system supported by the hardware dongle, the first processor requests the second processor for executing at least one application program operated under the operating system by using the control signal, the second processor transmits image data of the at least one application program to the first processor after the at least one application program is executed, the second interface is displayed under the operating system, and the second processor performs the at least one second function by executing the at least one application program.

10. The display device of claim 8, wherein the transmission port is coupled to the signal transceiver, the signal transceiver is linked to a remote controller or a smart phone.

11. The display device of claim 8, wherein the first processor detects communicating stability of the hardware dongle connected to the display device through the transmission port, and when the hardware dongle is stably connected to the transmission port, the first processor maps the at least one first operating option of the first interface to the at least one second operating option of the second interface.

12. The display device of claim 11, wherein when the hardware dongle is stably connected to the transmission port, the first processor adjusts content data or a format of the first interface, and after the content data or the format of the first interface is adjusted, the first processor converts the first interface to the second interface.

13. The display device of claim 8, wherein the first interface is a built-in interface, the second interface in a user-defined interface, the at least one first function is at least one built-in function, and the at least one second function is at least one expandable application program function operated under an operating system (OS).

14. The display device of claim 8, wherein the data link is configured to transmit a video signal and the control signal of the second interface between the display device and the hardware dongle.

15. A hardware dongle capable of coupling to a display device, the hardware dongle comprising:
a signal transceiver; and
a second processor coupled to the signal transceiver;
wherein the display device comprises a first processor, a first memory, and a transmission port, the first memory is coupled to the first processor, the transmission port is coupled to the first processor, the signal transceiver establishes a data link to the first processor through the transmission port, the second processor generates a second interface to the first processor after the data link is established, the first processor generates a control signal through the second interface for executing at least one function, a first interface and the second interface are different, at least one first function is supported by the first processor, at least one second function is supported by the second processor, and the at least one first function and the at least one second function are integrated for generating the second interface by the first processor after the data link is established; and
wherein the first processor is coupled to a control panel, the control panel is configured to input at least one second operating option to the second interface, the first processor transmits the control signal to the second processor, when the control signal corresponds to the at least one second operating option, the second processor executes the at least one second function according to the control signal and transmits image data of the at least one second function to the first processor, and when the control signal corresponds to at least one first operating option, the second processor maps the control signal to a control code through the second interface and transmits a command signal to the first processor for executing the at least one first function according to the control code.

16. The hardware dongle of claim 15, further comprising:
a second memory configured to install an operating system (OS) supported by the hardware dongle;
wherein the first processor requests the second processor for executing at least one application program operated under the operating system by using the control signal, the second processor transmits image data of the at least one application program to the first processor after the at least one application program is executed, the second interface is displayed under the operating system, and the second processor performs the at least one second function by executing the at least one application program.

17. A display device capable of coupling to a hardware dongle, the display device comprising:
a first processor;
a first memory coupled to the first processor; and
a transmission port coupled to the first processor;
wherein the hardware dongle comprises a signal transceiver and a second processor, the second processor is coupled to the signal transceiver, the first processor establishes a data link to the signal transceiver through the transmission port, the second processor generates a second interface to the first processor after the data link is established, the first processor generates a control signal through the second interface for executing at least one function, a first interface is stored in the first memory, the first interface and the second interface are different, at least one first function is supported by the first processor, at least one second function is supported by the second processor, and the at least one first function and the at least one second function are integrated for generating the second interface by the first processor after the data link is established; and
wherein the first processor detects communicating stability of the hardware dongle connected to the display device through the transmission port, and when the hardware dongle is stably connected to the transmission port, the first processor maps at least one first operating option of the first interface to at least one second operating option of the second interface.

18. The display device of claim 17, further comprising:
a control panel coupled to the first processor and configured to input the at least one second operating option to the second interface;
wherein the first processor transmits the control signal to the second processor, when the control signal corresponds to the at least one second operating option, the second processor executes the at least one second function according to the control signal and transmits image data of the at least one second function to the first processor, and when the control signal corresponds to the at least one first operating option, the second processor maps the control signal to a control code through the second interface and transmits a command signal to the first processor for executing the at least one first function according to the control code.

\* \* \* \* \*